US010017288B2

(12) United States Patent
Bockisch et al.

(10) Patent No.: US 10,017,288 B2
(45) Date of Patent: Jul. 10, 2018

(54) SYSTEM FOR FILLING CONTAINERS, HAVING A TRANSPORT DEVICE

(71) Applicant: KRONES AG, Neutraubling (DE)

(72) Inventors: Christian Bockisch, Neutraubling (DE); Robert Klein, Neutraubling (DE)

(73) Assignee: Krones AG, Neutraubling (DE)

( * ) Notice: Subject to any disclaimer, the term of this patent is extended or adjusted under 35 U.S.C. 154(b) by 79 days.

(21) Appl. No.: 15/128,409

(22) PCT Filed: Apr. 9, 2015

(86) PCT No.: PCT/EP2015/057703
§ 371 (c)(1),
(2) Date: Sep. 22, 2016

(87) PCT Pub. No.: WO2015/155282
PCT Pub. Date: Oct. 15, 2015

(65) Prior Publication Data

US 2018/0134434 A1 May 17, 2018

(30) Foreign Application Priority Data

Apr. 9, 2014 (DE) ........................ 10 2014 105 034

(51) Int. Cl.
*B65B 57/20* (2006.01)
*B65B 3/04* (2006.01)
(Continued)

(52) U.S. Cl.
CPC .............. *B65B 57/20* (2013.01); *B67C 3/007* (2013.01)

(58) Field of Classification Search
None
See application file for complete search history.

(56) References Cited

U.S. PATENT DOCUMENTS 5,149,162 A 9/1992 Focke et al.
5,355,991 A * 10/1994 Baranowski ............ A23L 3/001 198/412

(Continued)

FOREIGN PATENT DOCUMENTS

CN 2818445 Y 9/2006
CN 102123915 A 7/2011

(Continued)

OTHER PUBLICATIONS

International Search Report, PCT Application PCT/EP2015/057703 dated Jul. 2, 2015.

(Continued)

*Primary Examiner* — Kavel Singh
(74) *Attorney, Agent, or Firm* — Lowenstein Sandler LLP

(57) ABSTRACT

The present invention relates to a filling system for filling containers, such as cans, in the beverage-processing industry, comprising at least one filling station connected to a product storage container, a transport device by means of which containers are conveyed to the filling station, and a container feeding means that feeds containers to the transport device in layers, the transport device having arranged thereon a counter capable of determining the number of containers in the transport device, characterized in that a control unit is provided, which controls the container feeding means depending on the product amount available in the product storage container and on the number of containers in the transport device. The invention also relates to a corresponding method.

18 Claims, 4 Drawing Sheets

(51) Int. Cl.
*B65G 47/00* (2006.01)
*B67C 3/00* (2006.01)

(56) References Cited

U.S. PATENT DOCUMENTS

| | | | | |
|---|---|---|---|---|
| 6,260,688 | B1 * | 7/2001 | Steeber | B65G 21/18 198/347.4 |
| 7,278,531 | B2 * | 10/2007 | Hartness | B65G 17/385 198/470.1 |
| 2015/0291367 | A1 * | 10/2015 | Petrovic | B65G 47/5113 198/347.1 |
| 2016/0009498 | A1 * | 1/2016 | Napravnik | B65G 21/2072 198/836.3 |
| 2016/0052764 | A1 * | 2/2016 | Fuhrer | B67C 3/007 348/143 |

FOREIGN PATENT DOCUMENTS

| | | | |
|---|---|---|---|
| DE | 2226465 | A1 | 12/1973 |
| DE | 10034241 | A1 | 7/2002 |
| DE | 102008037708 | A1 | 2/2010 |
| DE | 102010053772 | A1 | 6/2012 |
| EP | 0412373 | A1 | 2/1991 |
| WO | 2010018224 | A1 | 2/2010 |

OTHER PUBLICATIONS

Notification of First Office Action for Chinese Patent Application No. 201580018813.6 dated Jun. 26, 2017, 13 pages (English translation only).

* cited by examiner

SYSTEM FOR FILLING CONTAINERS, HAVING A TRANSPORT DEVICE

This patent application claims the benefit under 35 U.S.C. § 371 of International Application No. PCT/EP2015/057703, filed Apr. 9, 2015, which is herein incorporated by reference, and which claims priority to International Application of German Patent Application No. 102014105034.7, filed Apr. 9, 2014.

The present invention relates to a filling system for filling containers, such as cans, in the beverage-processing industry.

PRIOR ART

The use of filling systems for filling containers, such as cans, in the beverage-processing industry is well known. These filling systems are normally provided with a carousel or they are configured as linear fillers. The filling system has either arranged thereon a plurality of filling stations by means of which the containers can be filled. Normally, the containers are fed by conveyor belts. When cans are fed, the new containers are often transferred palletwise, initially randomly, onto the transport device where they are then singulated.

If a change of product is aimed at or if the stock of the product to be canned is exhausted, a certain number of containers will remain on the transport device, especially when the containers are supplied in layers. Since direct further use of said containers is normally not possible, they must be removed from the transport device and, possibly, disposed of. Depending on the production costs of the container and of the product, this may entail high losses.

Task

Starting from the known prior art, it is the object of the present invention to provide a filling system having a reduced reject rate and saving time when a change of grades is executed, with the containers being fed in layers.

Solution

According to the present invention, this object is achieved by the filling system according to claim 1 and the method of filling containers according to claim 8. Advantageous embodiments of the invention are defined in the subclaims.

According to the present invention, the filling system for filling containers, such as cans, in the beverage-processing industry comprises at least one filling system connected to a product storage container, a transport device by means of which containers are conveyed to the filling station, and a container feeding means that feeds containers to the transport device in layers, the transport device having arranged thereon a counter capable of determining the number (K) of containers in the transport device, and it is characterized in that a control unit is provided, which controls the container feeding means depending on the product amount (M) available in the product storage container and the number (K) of containers in the transport device. A filling system configured in this way allows the reject rate to be reduced or minimized in the case of a change of product or an almost empty or empty state of the product storage container.

According to an advantageous further development, the filling system is characterized in that the product storage container has arranged therein one or a plurality of sensors for periodically or continuously measuring the product amount (M) available in the product storage container, the sensors being able to transmit to the control unit a signal indicative of the filling level. The provision of at least one or of a plurality of sensors allows a real-time measurement of the filling level of the product storage container and, consequently, a very exact calculation and control of the container feeding means. Through the provision of a plurality of sensors a certain redundancy in the measurement is accomplished.

The transport device may comprise one or a plurality of inspection units capable of inspecting containers on the transport device and discharging them from the transport device. This offers the possibility of directly sorting out faulty containers prior to filling. Hence, the amount of filled rejects can be reduced.

According to an embodiment, the container feeding means feeds a number n>1 to the transport device in a feed cycle. A few ten but also up to a few hundred containers may here be transmitted to the transport device per feed cycle.

According to an embodiment, the filling system may additionally be characterized in that the containers fed to the transport device in a feed cycle may be fed in layers having the height of a container. When the height of the respective layers only corresponds to that of a container, the containers can more easily be advanced in the transport device.

According to an embodiment, the control unit determines an m number of layers, which are fed to the transport device by the container feeding means, from $$m = \left(\frac{M}{V} - K\right) : n,$$

where V stands for the container volume and the number m is either a) m=((M mod V)−K) mod n or b) m=(((M mod V)−K) mod n)+1. The control unit can thus control the container feeding means either such that one layer less than the actual number of layers required is transmitted to the transport device, which will have the effect that a certain residual amount of product will remain in the product storage container. This residual amount may then optionally be discharged from the product storage container.

In the second case, the number of containers transmitted to the transport device exceeds the number of containers that can be filled with the product amount available in the product storage container, so that at the end of the entire filling process, in the course of which the product storage container is emptied, a certain number of containers can be removed from the transport device and, optionally, be disposed of.

According to an embodiment, the filling system is characterized in that the filling system comprises an outlet through which superfluous product can be discharged in case a) and/or in that the transport device comprises a discharge device capable of discharging superfluous containers from the transport device in case b). Considering reasons of costs, it may here be deliberated whether superfluous product or superfluous containers should be disposed of. Since the production costs of the containers are normally substantially higher than the production costs of the product, superfluous product will be disposed of in many cases.

A method realized e.g. by one of the above filling systems and used for filling containers, such as cans, in the beverage-processing industry is characterized in that a feeding of containers to a transport device, which conveys the containers to a filling station, is controlled by a control unit depending on a product amount (M) available in a product storage container connected to the filling station and on the number (K) of containers in the transport device. Making use of this method a substantially more economic feed of containers can be realized.

According to an embodiment, the method is characterized in that the containers are fed to the transport device by a container feeding means in layers comprising n>1 containers and having the height of a container, with n being constant for a container grade. In this way, e.g. a few ten containers per feed cycle or a few hundred containers per feed cycle are transmitted by the container feeding means to the transport device and advanced by the latter.

The containers in the transport device may also be inspected and, depending on the result, discharged. This allows the containers fed to the transport device to be checked before they are filled and, optionally, a discharge of damaged or unsatisfactory containers may be caused prior to filling the containers, so that a waste of product will be avoided.

According to a further development of the method, the product amount (M) in the product storage container is measured continuously or periodically by one or a plurality of sensors and a signal indicative of the product amount is transmitted to the control unit. This allows a real-time measurement of the actual filling level of the product storage container and, consequently, a very exact calculation and control of the container feeding means in real time. Through the provision of a plurality of sensors, the measurement method is rendered redundant and robust against failure of individual sensors.

The control unit may determine a number m of layers, which are to be fed to the transport device, from $$m = \left(\frac{M}{V} - K\right) : n,$$

where V stands for the container volume and the number m is either a) m=((M mod V)−K) mod n or b) m=(((M mod V)−K) mod n)+1. According to this embodiment of the method, the number of containers transmitted to the transport device is either slightly higher than the number of containers that can be filled with the residual product amount or the number of containers transmitted to the transport device is slightly lower than the number of containers that could be filled with the residual product amount.

According to a further development of this embodiment, the method is characterized in that in case a) the superfluous product is discharged from the product storage container and in case b) containers which have not been filled are discharged from the transport device. Thus, it may be decided e.g. on the basis of economic aspects whether it will make more sense to dispose of superfluous product or to remove superfluous containers from the transport device and to optionally dispose of them.

According to an embodiment, the method is characterized in that the containers are fed to the transport device depending on the number (K) of containers in the transport device. A controlled transfer of containers to the transport device can be realized in this way.

Furthermore, the feeding of containers to the transport device may be stopped, if the number of containers in the transport device is K≥N, where N is an integer. If the predetermined number N is exceeded, the container feeding means may first be fully stopped and the transport device can continue to operate until it is at least partially empty.

SHORT DESCRIPTION OF THE FIGURES

FIGS. 3*a* to 3*e* show a schematic representation of an embodiment of the method according to the present invention.

DETAILED DESCRIPTION OF THE FIGURES

Figure 1:
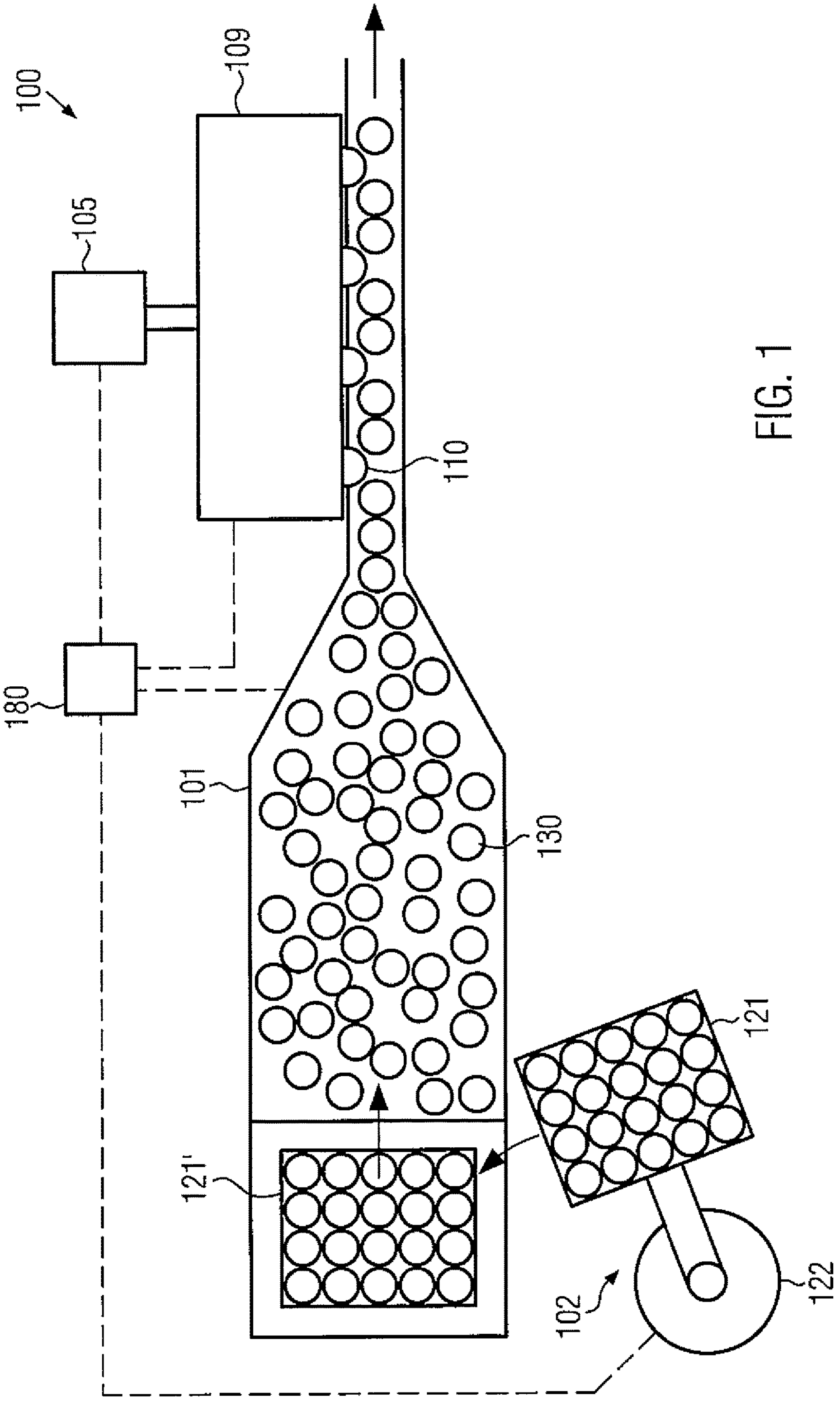
FIG. 1 shows a schematic representation of an embodiment of the filling system according to the present invention.

FIG. 1 shows a filling system 100 according to an embodiment. The filling system shown is configured as a linear filler and comprises one or a plurality of filling stations 110 connected to a product storage container 105. The filling stations 110 may e.g. be mounted on a suitable frame 109, in which also the feed lines from the product storage container 105 to the individual filling stations 110 may be arranged. Although the filling system 100 is here shown as a linear filler, it may also be configured as a carousel filler. In this case, the frame 109 may be replaced by a rotating carousel having the filling stations 110 attached thereto.

In the embodiment shown, a transport device 101, which feeds containers 130 to the filling stations 110, is additionally provided. This transport device may e.g. comprise a conveyor belt or holders, which feed the containers 130 to the filling stations 110, such as neck-handling holders, or air conveyance. The transport device 101 may comprise an infeed area in which a plurality of containers 130 is conveyed, e.g. randomly, on a comparatively broad conveyor belt. This area may, as shown here, narrow in the conveying direction of the containers 130, so that the containers 130 will have been singulated at the latest when they arrive in the area of the filling stations 110 and can then be fed separately to the filling stations. Also other embodiments of the transport device 101 are imaginable. For example, conveyance by means of rotary stars may be provided, especially when the filling system is configured as a carousel.

The transport device has connected thereto a container feeding means 102. The container feeding means may e.g. be configured as a pivotable robot arm 122, which transfers a pallet 121 with containers onto the transport device 101. The transferred pallet 121 may then be emptied by means of a sweep-off device. The pallet 121 or 121' may have provided thereon one or a plurality of layers of containers, so that several tens or even several hundreds of containers, in particular cans, e.g. 500 cans, can be transported on each pallet.

Furthermore, a control unit 180 is provided, which is connected to the product storage container 105, the transport device 101, the container feeding means 102 and, optionally, the filling stations 110 via the connections shown as a broken line. According to the present invention, the control unit 180 may control the container feeding means 102 and, optionally, the transport device 101 depending on the filling level of the product storage container 105. The control unit 180 controls the feeding of additional containers by the container feeding means 102 depending on the product amounts available in the product storage container 105 and the number K of containers on the transport device. If the residual product amount in the product storage container 105 is so small that it will only suffice to fill the containers 130 on the transport device, the control unit 180 will finish the continuous feeding of new containers by the container feeding means 102.

In addition, the control unit 180 may be connected directly to sensors in the product storage container 105, said sensors measuring the filling level of the product storage container 105 permanently or at periodic intervals and transmitting a corresponding signal to the control unit. In addition or alternatively, the control unit may be connected to the filling stations 110 and measure the product amount delivered and the number of filling processes, respectively. On the basis of a previously known initial filling level of the product storage container and the product amount delivered, the control unit is thus able to calculate how much product is still contained in the product storage container 105 and how many containers can be filled therewith. In addition, the control unit 180 is connected to the transport device or e.g. to a measurement device, such as a counter, which is capable of counting the number of containers on the transport device. If this number K is larger than the amount of containers that will be filled with the product amount M still contained in the product storage container, or equal thereto, the control unit will stop the feeding of additional container layers by the container feeding means 102. It follows that, subsequently, all the containers or almost all the containers that are still present on the transport device 101 can be filled and, when the product storage container has been emptied, there will only be a small number of containers that may have to be disposed of or there will only be a small residual amount of product in the product storage container that can or will have to be disposed of.

Figure 2:
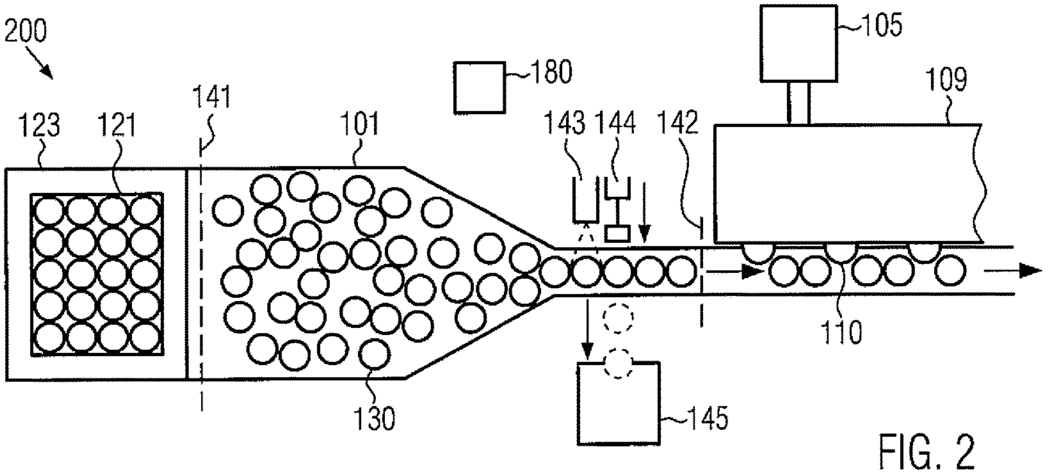
FIG. 2 shows a schematic representation of another embodiment of the filling system.

FIG. 2 shows a further embodiment of the filling system 200 according to the present invention. The characteristics of the filling stations and of the product storage container as well as of the transport device 101 have here not been changed in comparison with those according to FIG. 1 and are therefore not explained in more detail. According to the present embodiment, the transport device comprises one or a plurality of inspection or checking units. In particular, the transport device comprises two light barriers 141 and 142, which count the arrival of a number of containers on the transport device and the discharge of the containers to the individual filling stations. The containers fed to the transport device and the containers transferred from the transport device to the filling stations are here counted so that the total number of containers in the transport device can be determined. The individual containers are here transferred from the pallet 121 from a feed area 123, which is arranged upstream of the light barrier when seen in the container conveying direction, to the transport device. In the course of this process, they pass through the first light barrier 141 and can thus be counted as having been transferred to the transport device. After having traveled through the transport device 101 far enough for being transferred to the filling station 110, they pass through the second light barrier 142 and are counted as having been transferred to the filling stations. Hence, the number of containers on the transport device results from the difference between the total number of containers fed and the number of containers that have been transferred to the filling station. Instead of the light barrier, also a camera or the like may be provided for detecting the containers.

In addition or alternatively, an inspection unit 143 is provided, which inspects the containers. This inspection unit may e.g. be a camera, which examines the container e.g. with respect to labeling or the print image or with respect to damage. The inspection unit is here not limited to a camera. Also other inspection units are imaginable.

If the inspection unit detects that a container does not fulfil the requirements, e.g. because it is damaged, the container may be discharged from the transport device 101 via a suitable discharge device 144. This discharge device may e.g. be a pusher which is capable of moving the respective container away from the conveyor belt and into a bin 145 provided for this purpose. If conveyance of the containers is realized e.g. via holders in a neck-handling process, the container and the holder in question may be diverted from the actual conveying path onto an alternative route or the container may be dropped into a bin located below the conveying path. Preferably, the inspection unit will transmit a signal to the control unit, which indicates that a container has been discharged from the transport device. Thus, it can be guaranteed that, even if a few containers have been discharged, the number of containers still present in the transport device will be known precisely. According to this embodiment, the number of containers still present in the transport device results from the total number of containers transferred to the transport device minus the number of containers transferred to the filling stations 110 minus the containers discharged from the transport device.

The discharge device 144 described here may also be used for discharging, if the product storage container is empty, the containers that are still present in the transport device.

Figure 3A:
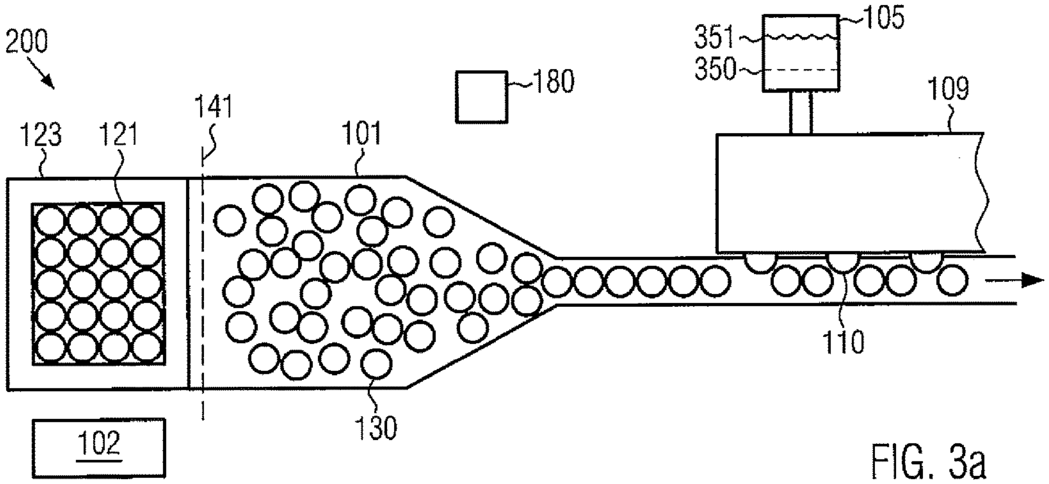

FIGS. 3*a* to 3*e* show the sequence of the steps of a method according to the present invention for filling containers, in particular cans, making use of a filling system according to e.g. one of the embodiments according to FIG. 1 or 2. In FIG. 3*a*, the product storage container 105 is filled, as is schematically shown by the filling level 351. The control unit may already calculate on the basis of this filling level how many containers can still be filled with the product available in the product storage container, but it may also control an initially unhindered feeding of additional containers by the container feeding means 102, since the filling level 351 of the product storage container corresponds here to a filling level that would suffice to fill a much larger number of containers than the number K of containers in the transport device 101.

Figure 3B:
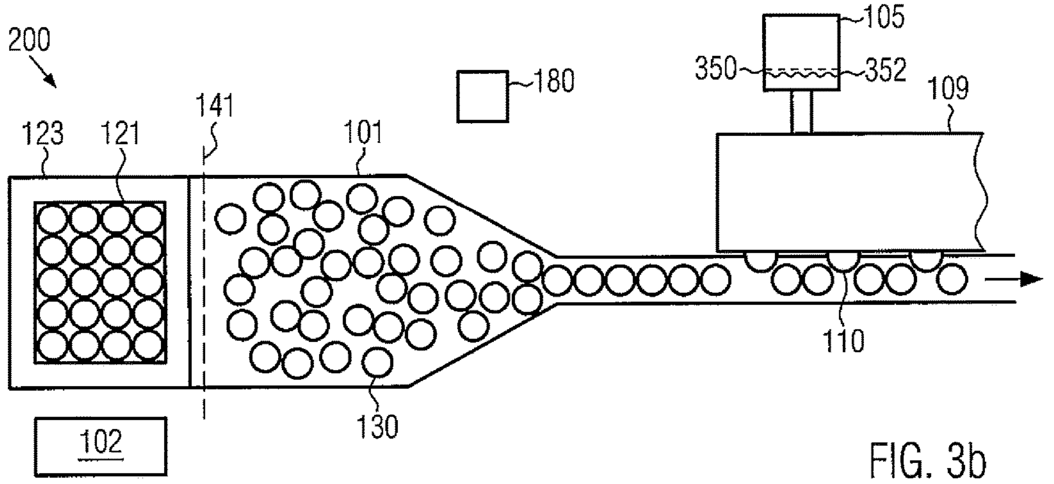

In FIG. 3*b* additional containers have been filled, so that the filling level 352 remains in the product storage container 105. This filling level is lower than a predefined value 350. This predefined value may e.g. correspond to a remaining number of containers that can still be filled with this quantity. By way of example, the filling level 350 may correspond to a filling level that allows 10,000 additional containers to be filled. From this filling level 350 onwards at the latest, the control unit calculates how many containers must still be fed to the transport device 101 by the container feeding means 102. To this end, it first calculates the number of containers that can still be filled with the filling level 352. In principle, this number results from the quotient obtained by M divided by V, where M indicates the remaining product amount according to the filling level 352 and V the volume of each individual container. Hence, this value corresponds to the number of containers that can still be filled. In order to determine how many containers must still be transferred to the transport device by the container feeding means, the control unit determines the difference between the number of containers that can still be filled and the number K of the containers in the transport device. For example, 4,500 of the 10,000 containers that can be filled may already be located in the transport device 101, so that 5,500 additional containers would have to be transferred by the container feeding means. Since it does not make much sense to fill a container only partially, the above quotient is determined without any remainder according to an embodiment, i.e. the number of containers that can still be filled with the product amount M is determined through M div V. It follows that the number m of container layers still to be transferred to the transport device by the container feeding means results from $$m = \frac{M \bmod V}{n}.$$

This division may also be executed without any remainder, so that an integer of residual layers is transmitted as a control signal to the container feeding means 102. In this case m corresponds to the number of complete layers, which are still required for emptying the product storage container. If the number n of containers is 500 per layer, the result obtained for the above example is that the container feeding means must still feed m=11 layers.

According to an embodiment, the determination of the-to-be-determined number m of remaining layers, which are to be fed to the transport device, may be executed only once, when the filling level falls below the critical filling level 350. Since it may, however, be necessary to reject containers while they are being conveyed, because some of them may be damaged or unsatisfactory, the calculation may, according to an embodiment, also be executed periodically at intervals of e.g. one minute or two minutes, so as to reduce the reject rate.

Another possibility that may be provided is that only the reaching of the critical filling level is transmitted to the control unit as a signal and that a continuous or a periodic calculation of the still required containers is determined on the basis of the number K of containers in the transport device and the number of discharged and filled containers. In this case, the number of the layers required results from $$m = \frac{(M \bmod V) - K + A - B}{n},$$

where A stands for the total number of discharged containers after the critical filling level has been reached and B stands for the number of filled containers after the critical filling level has been reached.

Figure 3C:
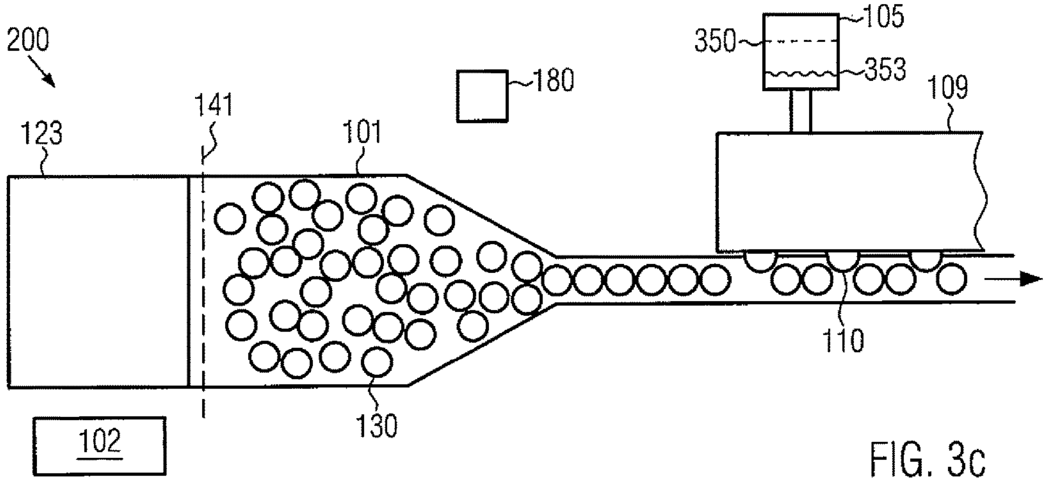

In FIG. 3*c*, the container feeding means has transferred the last layer of containers to the transport device 101. From this moment onwards, only the containers that are on the transport device will be fed to the filling stations. Since the amount of containers required or of layers required, which has previously been calculated by the control unit, corresponds at least approximately to the amount of containers that can still be filled with the residual amount of product from the product storage container, it is guaranteed that the amount 353 remaining in FIG. 3*c* will suffice to fill all the containers that are still present in the transport device 101. Since, for calculating the number m of layers still required, the division is executed without a remainder in the above equations, the calculated number m will, in effect, always be slightly lower or, at most, equal to the actual number of layers required. Therefore, and with due regard to a number of containers which will be discharged prior to filling because they are damaged, residual product will presumably remain in the product storage container when the control method described is used, and all the containers on the transport device will be filled.

If this is the case, the transport device 101 will be empty when a minimum filling level 354 of residual product is reached in the product storage container 105, all the containers 130' will have been filled and will have passed the filling stations and the remaining residual amount of product according to the filling level 354 can be disposed of and e.g. a new product can be filled into the product storage container 105.

This condition is reached when the number m of container layers which still have to be transferred to the transport device by the container feeding means is calculated according to the above formula, i.e. that m=((M mod V)−K)mod n. Since the number of containers in the transport device will, if at all, decrease because containers are discharged from the transport device due to deficiencies, the number of containers available in the case of this embodiment will, in an extreme case, not suffice for guaranteeing that the product storage container 105 can be emptied.

Depending e.g. on economic considerations, a residual amount of containers 130" may, however, remain in the transport device 101 when the product storage container 105 has already been fully emptied. This case may arise when the product canned is of higher value than the containers 130. In this case, the calculation of the still required layers m, which is executed by the control unit, will be executed with m=(((M mod V)−K)mod n)+1. In this case, the amount of the layers still required for emptying the product storage container is rounded up by one layer, which means that the number of containers fed to the transport device by the container feeding means will in any case be higher than the number of containers that can be filled by the residual product amount. It follows that this embodiment e.g. allows to take into account that at least some of the containers will be sorted out as rejects already prior to filling and to take into consideration that, for economic reasons, it may be more advantageous to dispose of containers that remain in the transport device than to dispose of a residual amount of product. If the calculation of the still required number m of layers is carried out periodically and not only once, when the filling level falls below the critical filling level 350, the present embodiment achieves that the product storage container 105 will be emptied in any case, while a few containers 130" may possibly remain in the transport device 101 and be sorted out.

Figure 3D:
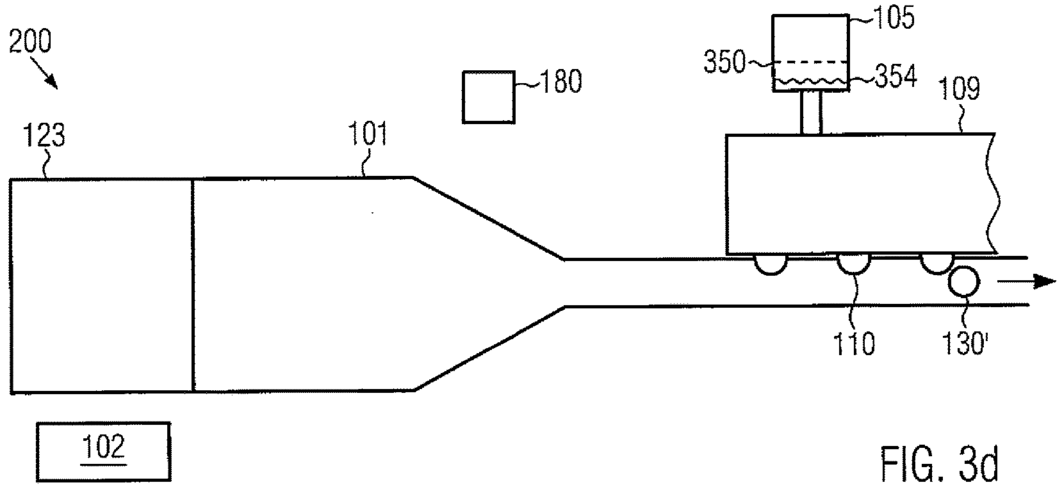
Figure 3E:
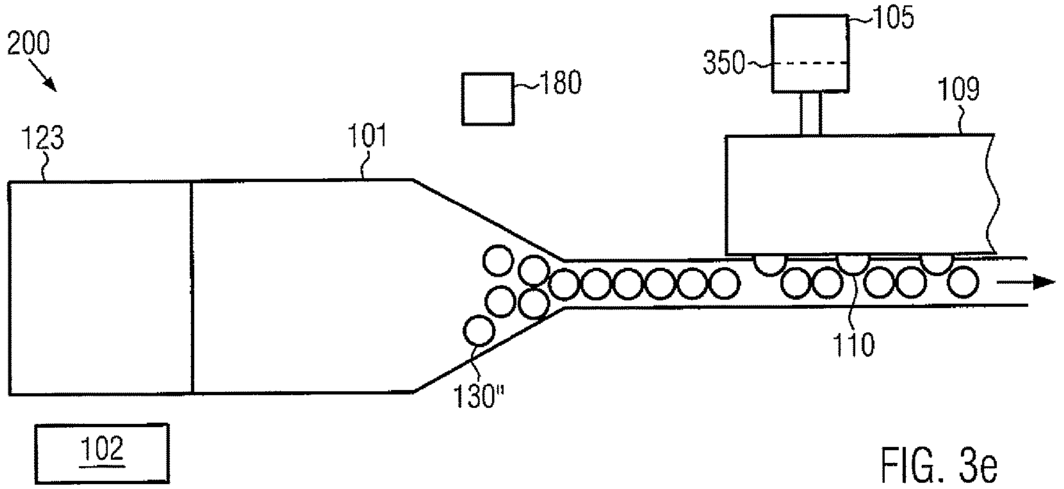

In any case, the embodiments for controlling the container feeding means by the control unit 180 according to FIG. 3*d* or 3*e* guarantee that the reject rate either of containers (FIG. 3*e*) or of residual product (FIG. 3*d*) will be minimal, in spite of the fact that the containers are transferred to the transport device 101 in layers. In the case of FIG. 3*e*, the residual containers 130" may be discharged e.g. via the discharge device described in FIG. 2, before e.g. a change of grades takes place and new containers are transferred to the transport device and a new product is filled into the product storage container 105. If a product amount 354 remains in the product storage container 105 even after the last containers 130' have left the filling station (FIG. 3*d*), the residual product amount 354 can be discharged from the product storage container 105 via a suitable outlet, thus preventing the next product from being contaminated with the original product, especially in the case of a change of grades.

The invention claimed is:

1. A filling system to fill containers comprising:

at least one filling station connected to a product storage container;

a transport device to convey containers to the at least one filling station, the transport device having arranged thereon a counter capable of determining a number (K) of containers in the transport device;

a container feeder to feed containers to the transport device in layers; and a control unit to control the container feeder depending on a product amount (M) available in the product storage container and on the number (K) of containers in the transport device, wherein the control unit determines a number (m) of layers, which are fed to the transport device by the container feeder, from $$m = \left(\frac{M}{V} - K\right): n,$$

where V stands for a container volume and the number m is either case a) where m=((M div V)−K)div n or case b) where m=((M div V)−K)div n+1.

2. The filling system according to claim 1, wherein the product storage container has arranged therein one or a plurality of sensors for periodically or continuously measuring the product amount (M) available in the product storage container, wherein the sensors are to transmit to the control unit a signal indicative of a filling level.

3. The filling system according to claim 1, wherein the transport device comprises one or a plurality of inspection units to inspect containers on the transport device and discharge the containers from the transport device.

4. The filling system according to claim 1, wherein each of the layers comprises n containers, where n≥100.

5. The filling system according to claim 1, wherein each of the layers is a monolayer.

6. The filling system according to claim 1, wherein the filling system comprises an outlet through which superfluous product can be discharged in case a) or wherein the transport device comprises a discharge device capable of discharging superfluous containers from the transport device in case b).

7. A method of filling containers comprising:

controlling, by a control unit, a feeding of containers to a transport device, which conveys the containers to a filling station, wherein the feeding of the containers to the transport device is dependent on a product amount (M) available in a product storage container connected to the filling station and on a number (K) of containers in the transport device; and determining, by the control unit, a number (m) of layers, which are to be fed to the transport device, from $$m = \left(\frac{M}{V} - K\right): n,$$

where V stands for a container volume and the number m is either case a) m=((M div V)−K) div n or case b) m=((M div V)−K)div n+1.

8. The method according to claim 7, further comprising:

feeding the containers to the transport device in a plurality of container layers, wherein each container layer of the plurality of container layers comprises n containers, where n≥100, with n being constant for a container grade.

9. The method according to claim 7, wherein an inspection is performed on the containers in the transport device, and wherein the containers are discharged dependent on a result of the inspection.

10. The method according to claim 7, wherein the product amount (M) in the product storage container is measured continuously or periodically by one or a plurality of sensors and a signal indicative of the product amount is transmitted to the control unit.

11. The method according to claim 7, wherein in case a) superfluous product is discharged from the product storage container and in case b) containers which have not been filled are discharged from the transport device.

12. The method according to claim 7, further comprising:

feeding the containers to the transport device based on the number (K) of containers in the transport device.

13. A filling system to fill containers comprising:

at least one filling station connected to a product storage container;

a transport device to convey containers to the at least one filling station, the transport device having arranged thereon a counter capable of determining a number (K) of containers in the transport device;

a container feeder to feed containers to the transport device in layers; and a control unit to control the container feeder depending on a product amount (M) available in the product storage container and on the number (K) of containers in the transport device, wherein the control unit determines a number (m) of layers, which are fed to the transport device by the container feeder, from $$m = \left(\frac{M}{V} - K\right): n,$$

where V stands for a container volume and the number m is either case a) where m=((M mod V)−K) mod n, or case b) where m=(((M mod V)−K) mod n)+1.

14. The filling system according to claim 13, wherein the product storage container has arranged therein one or a plurality of sensors for periodically or continuously measuring the product amount (M) available in the product storage container, wherein the sensors are to transmit to the control unit a signal indicative of a filling level.

15. The filling system according to claim 13, wherein the transport device comprises one or a plurality of inspection units to inspect containers on the transport device and discharge the containers from the transport device.

16. The filling system according to claim 13, wherein the filling system comprises an outlet through which superfluous product can be discharged in case a) or wherein the transport device comprises a discharge device capable of discharging superfluous containers from the transport device in case b).

17. The filling system according to claim 13, wherein each of the layers comprises n containers, where n≥100.

18. The filling system according to claim 13, wherein each of the layers is a monolayer.

* * * * *